United States Patent [19]
Kleinrock et al.

[11] Patent Number: 5,936,542
[45] Date of Patent: Aug. 10, 1999

[54] CONVENTION ID BADGE SYSTEM

[75] Inventors: Leonard Kleinrock; Joel E. Short, both of Los Angeles, Calif.

[73] Assignee: Nomadix, LLC, Santa Monica, Calif.

[21] Appl. No.: 08/562,515

[22] Filed: Nov. 24, 1995

Related U.S. Application Data

[60] Provisional application No. 60/005,655, Sep. 11, 1995.

[51] Int. Cl.$^6$ .................................................. G06K 7/06
[52] U.S. Cl. ............................ 340/825.34; 340/825.31; 235/380; 235/382; 235/382.5; 235/492
[58] Field of Search .................. 340/825.34, 825.31; 235/380, 382.5, 382, 492; 395/201, 230

[56] References Cited

U.S. PATENT DOCUMENTS

| | | | |
|---|---|---|---|
| 4,026,642 | 5/1977 | Tanaka et al. | 355/1 |
| 4,233,661 | 11/1980 | Bolton et al. | 364/300 |
| 4,509,277 | 4/1985 | Bolton | 40/1.5 |
| 4,654,793 | 3/1987 | Elrod | 364/401 |
| 4,806,743 | 2/1989 | Thenery | 235/472 |
| 4,816,654 | 3/1989 | Anderl et al. | 235/380 |
| 5,019,697 | 5/1991 | Postman | 235/441 |
| 5,030,807 | 7/1991 | Landt et al. | 235/375 |
| 5,149,945 | 9/1992 | Johnson et al. | 235/380 |
| 5,287,269 | 2/1994 | Dorrough et al. | 364/408 |
| 5,321,395 | 6/1994 | Van Santbrink | 340/825.31 |
| 5,351,186 | 9/1994 | Bullock et al. | 364/401 |

*Primary Examiner*—William A. Cuchlinski, Jr.
*Assistant Examiner*—Yonel Beaulieu
*Attorney, Agent, or Firm*—James Creighton Wray; Meera P. Narasimhan

[57] ABSTRACT

A convention ID badge system which provides a trade-show badging system for two-way data exchange. It uses a floppy disk as an ID badge and stores exhibitor's data on the ID badge. A user takes home an electronic record of the event, electronically stores all the brochures onto the diskette and computerizes a business card by using the IDisk. The new IDisk System replaces the old fashioned badge with a floppy disk loaded with information that attendees take home with them. The IDisk System has two components: the attendee Idisk badge and the exhibitor IDisk station. The badge identifies attendees by name visually and by electronic imprint, plus it provides room to retrieve selected data from the exhibitor's IDisk station.

99 Claims, 2 Drawing Sheets

CONVENTION ID BADGE SYSTEM

This is a Provisional application Ser. No. 60/005,655, filed Sep. 11, 1995.

BACKGROUND OF THE INVENTION

Attendees at conferences and trade shows usually wear admission badges with their names in large letters. When they visit booths they take literature and sometimes leave business cards. Often the volume of literature becomes great. Frequently, it is not further used or referred to because desired information is buried in a pile of literature with no convenient way to find it. From year to year, storage of conference exhibitors material becomes difficult.

Attendees business cards are often informally given to new acquaintances or old friends. To avoid embarrassment among colleagues, attendees sometimes are reluctant to leave business cards of limited supply at exhibitors booths.

Exhibitors spend large amounts to rent staff and decorate booths and to print literature. Usually exhibitors depend on attendees taking literature and leaving business cards as a means of reaching new prospective customers or learning of interests of old customers.

Business cards may be lost or notes incorrectly made and cards require some further effort and activity on the part of the exhibitor.

Needs exist for better attendee-exhibitor communications so that both can increase benefits from their brief encounters.

SUMMARY OF THE INVENTION

A software product is used as an ID "Badge" at conferences, exhibitions, trade shows, symposia, events, etc. Instead of the usual paper or cardboard tag one wears in a plastic holder on one's shirt or jacket. The "attendee" is given a portable badge that can be written to and read by a computer type device. Our current manifestation of this is a 3.5" floppy disk as used for personal computers. The badge would contain a paper label stuck on it to allow people to visually read the attendee's name, company, etc, along with any other identification needed for access to the event's activities (tutorials, show, conference, etc).

Advantages are as follows. It allows the event coordinator to create the badge directly from the coordinator's computer since it can write directly to the floppy any information that was obtained via mail, telephone, etc. regarding the attendee. The floppy and its paper label are prepared before the conference if the attendee has preregistered, or are prepared at the conference site if he appears on that morning or if a change is needed. In addition to his ID information, the badge would have software written on it to control any exchange of data from the badge to "others."

Specifically, if there were exhibits at a trade show, then the attendee would be able to walk up to a vendor's exhibit and insert his badge into a PC or laptop at the vendor's booth, and thereby pass his name, address, etc. to the vendor electronically. At the end of the event, the vendor has a convenient list of all those who visited his booth in machine readable form. The vendor, by using the software, can annotate the attendee's record on his PC to customize it (e.g., to remind the vendor to send the attendee some information, etc.).

Moreover, when the attendee's floppy is in the vendor's PC, the vendor has an opportunity to write on the floppy any information the vendor chooses to describe his product, to give his address, his e-mail, a pointer to his World Wide Web home page (known as a Universal Resource Locator or URL), or anything else (up to a maximum amount per "write", so as not to use up the attendee's space on his floppy).

The vendor will be given a device (typically a PCMCIA card) to attach to his PC or laptop (or if he has no such device, Nomadix will lend a laptop with PCMCIA card to the vendor). The software will reside on the PCMCIA card and cannot be copied onto the vendor's PC.

Further, the software will greatly reduce the possibility that viruses will be transferred to the attendee's floppy disk. Thus, the attendee goes home with a machine readable collection of information about the vendors he visited, along with pointers from the vendors to more information. Not only do the attendees and the vendors end up with machine readable information, but also the event managers get a machine readable summary (with full detail if desired) about what happened at the event (how many booths each attendee visited, in what order booths were visited, etc.). That is valuable for future marketing to the attendees and to the vendors. The use of a floppy disk is only one example; if some other machine readable/writable device gains wide acceptance (say a smart card), then it can be used as well or in place of the disk. Lastly, there are possible extensions or generalizations which can be used to enhance the functionality and use of the ID badge.

The invention uses a portable device (floppy disk, smart card, etc.) which can be read and written electronically as a mechanism for visually and electronically identifying individuals and for exchanging information between and among attendees and exhibitors at meetings, conventions, trade shows, expositions, etc.

The invention uses the device (which is referred to as a disk or badge) as a badge. A customized disk access program is used in the exhibitor's computer to control disk information from viruses, unwanted writing, etc.

The exhibitor uses a computer to exchange information with the attendee. The invention provides the exhibitor with a mechanism (e.g., a PCMCIA card or PC card) that contains the software for interacting with the attendee. That will allow the exhibitor to use his own PC for the interchange.

The invention provides the exhibitor with a complete (possibly customized) record of all attendee interactions with that exhibitor during the conference. The invention provides the conference organizers a compiled set of records gathered from all interactions among and between all attendees and exhibitors for the purpose of marketing, billing, and evaluation.

These and further and other objects and features of the invention are apparent in the disclosure, which includes the above and ongoing written specification, with the claims and the drawings.

DETAILED DESCRIPTION OF THE PREFERRED EMBODIMENTS

Figure 1:
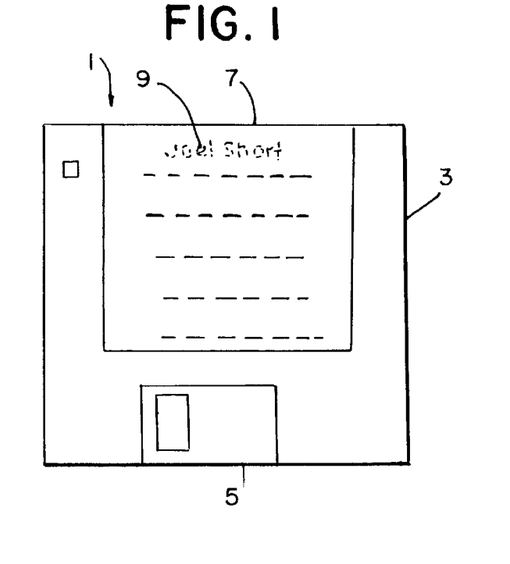
FIG. 1 is an elevation of an IDisk badge.
Figure 2A:
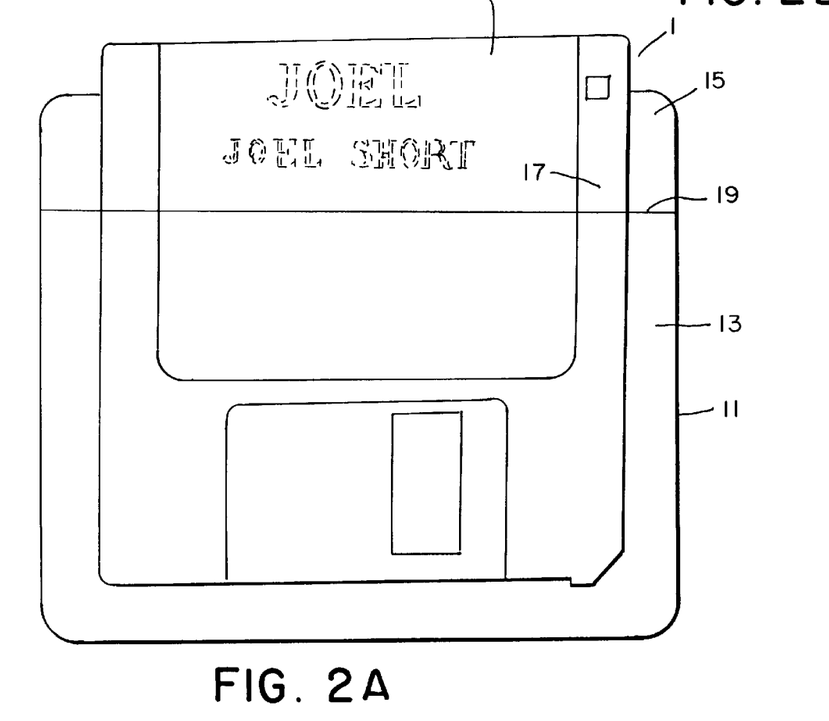
FIG. 2A is a side of an IDisk badge in a badge holder.
Figure 2B:
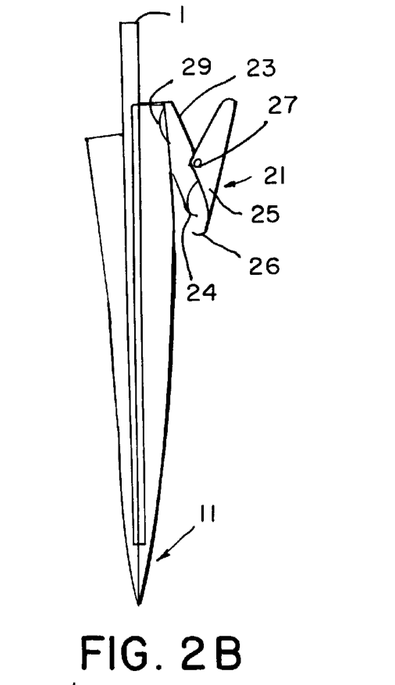
FIG. 2B is a side of an IDisk badge in a badge holder.

Referring to FIGS. 1, 2A and 2B:

An IDisk badge of the invention is generally referred to by the numeral 1. The badge has a body 3, a disk protecting side 5, and a label 7 with large indicia 9 which is visually accessible at normal talking distances. Label 7 identifies the attendee. The badge 1 is carried, as shown in FIGS. 2A and 2B, in a badge holder 11 with a front layer 13 and a rear layer 15 forming an upward-opening pocket 17 having an upper edge 19.

The label 7 on the badge is visually readable above and through the front layer 13 when the badge is in the pocket 17.

As shown in FIG. 2B, an upper portion of the rear layer 15 supports an alligator clip 21 which has portions 23 and 25 hinged by a pin 27. A spring urges the jaws 24 and 26 together. A rivet 29 supports the holder on the alligator clip 21.

One example of a badge is a 3.5" floppy disk with the attendee's badge info (name, affiliation, etc.) printed on the label attached to the disk. An example is shown in the following diagram:

A company name and logo appear on the label on the backside of the disk. The phone number, e-mail, or universal resource locator (URL) may also be stored on the badge.

The disk is created by a conference coordinator who is responsible for taking care of the registration of the attendee. The attendee's information is pulled up on the computer or entered into the computer when the attendee approaches the counter. A printer is attached to the computer(s) which has sheets of adhesive labels in the paper tray. The label itself is already colored with the company logo on it. All that is printed on the label is the attendee's information, conference title, and date. Since the company logo and label is already colored, the printer does not need to be a color printer. Once the computer prints the information on the label, the label is removed and placed on the disk. Then the labeled disk is placed in a clear plastic holder to house the badge (disk) when being worn.

There are sheets of color adhesive disk labels in the printer paper tray. A stack of blank (pre-formatted) floppy disk and clear-plastic holders are available. The worker starts with a blank floppy disk in the floppy drive of the computer they are using for registration.

1. An attendee walks up to the counter and his/her information is brought up by the worker (either pulled up if pre-registered or entered in); this information can be verified by the attendee at this point. It is possible that the attendee is requesting a replacement badge in which the old badge is returned and a new badge is issued (informing the user that they are sorry their information on the disk has been lost.), or the attendee may be requesting an additional badge (e.g., previous disk is full) in which case another disk is issued to the attendee.

2. The worker selects an option to make the badge. The info is sent to the printer and printed on the label. The user's info is written to the floppy disk.

3. The worker removes the printed label from the printer and places it on the diskette from the drive.

4. The worker places the labeled disk in a clear-plastic badge holder.

5. The badge is handed to the attendee and a new blank disk is inserted into the drive.

Initial Disk Contents

When the worker requests that the badge be created, a file is created on the disk with the attendee's information. All attendee information files on each disk have the same name:

attendee.nfo

This file may contain the following information (similar to a business card):

Last Name
First Name
Middle Name
Title
Organization/Company Name
Work Phone Number (with optional extension)
Fax Phone Number
E-mail Address
WWW Address
Business Address Line 1
Address Line 2
City
State
ZIP
Preferred Method of Contact Other Information can be included as requested by attendee.

The conference can decide which standard information is included in the information file on each disk.

The information can be stored in a clear text format (one entry per line), or coded into a way that one has to use special disk access software stored on the disk to read/write the information. However, if the information is coded, then only PC's will probably be able to run the special software. Ideally, the information can be kept in the clear so it can be easily read/written to on UNIX, Mac, DOS, OS/2 and Windows platforms (and any others).

Bundled Disk Access Software

In order for the attendee to access the information off the disk, once he/she has left the conference, software is placed on the disk. The software used to retrieve information from the disk is copied to each disk as part of the initial disk contents. This software is copied to the disk when the attendee information file is written. Either a DOS, Windows, Mac, and/or UNIX version of the application can be written to the disk. Either the attendee can choose which software they want included, or if the software is small enough, have a version for each platform on the same disk.

The disk access software can be either:

custom software which runs on Windows (future platforms) or be a public domain WWW Browser.

OR

If custom software is used, then there is a tighter control over how the information can be stored/accessed. The custom software can utilize graphics and other functions not available with standard Web browsers. A version of the custom software can be written for various platforms (Windows, Mac, UNIX, DOS).

WWW Browser software would provide a more flexible operating environment. That would reduce time-to-market by not requiring custom software to be written. The latest version of a public domain browser can be distributed on the disk if desired. Accessing the data can be done via scripts or small C programs residing on the disk.

Exchanging Information

When walking around the conference or exhibition, when the attendees see a booth that they want information from, they can insert their badges into the exhibitor's computer, and information is stored on their badges/disks. The exhibitor can also collect information from the attendee by copying the information file from the disk to their computer. This exchange of information in both directions can be done virtually at the same time.

When the attendee walks up to the booth, there will be a computer/laptop available which he/she can use to select the information desired. The attendee places the badge/disk inside the disk drive and makes appropriate choices from the menu of options. The exhibitor can choose to have as many or as few menu options as desired (although encouraged to keep it to a minimum).

System Architecture

Figure 3:
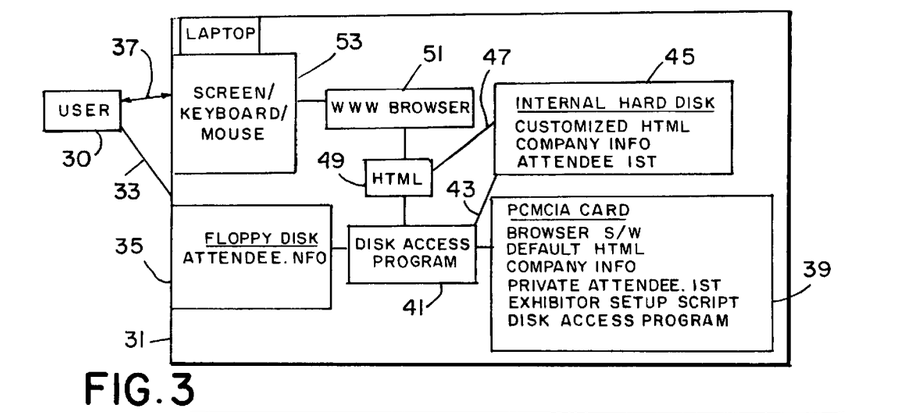
FIG. 3 is a schematic representation of a user using an IDisk badge with an exhibitor's dedicated personal or laptop computer.
Figure 4:
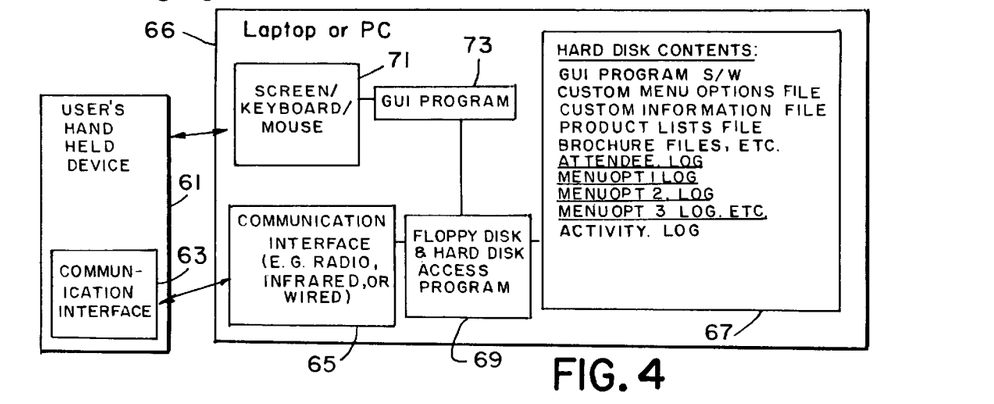
FIG. 4 is a schematic representation of a user using an IDisk badge with a communication interface in communication with an exhibitor's dedicated personal or laptop computer.

As an example, the following system architecture shown in FIGS. 3 and 4 can be used on the exhibitor's system.

As shown in FIG. 3, a user 30 approaches an exhibitor's IDisk station which is a PC or laptop computer 31. The user 30 inserts 33 the IDisk into a slot 35 and responds 37 to data on a screen with inputs on a keyboard and mouse. A PCMCIA or PC card 39 inserted in the computer 31 provides the disk access program 41 which writes 43 information into the hard disk 45. The hard disk reads and writes information 47 from and to the hard drive as controlled by the disk access program, HTML code 49 and WWW Browser software 51 and the screen/keyboard/mouse 53.

Figure 5:
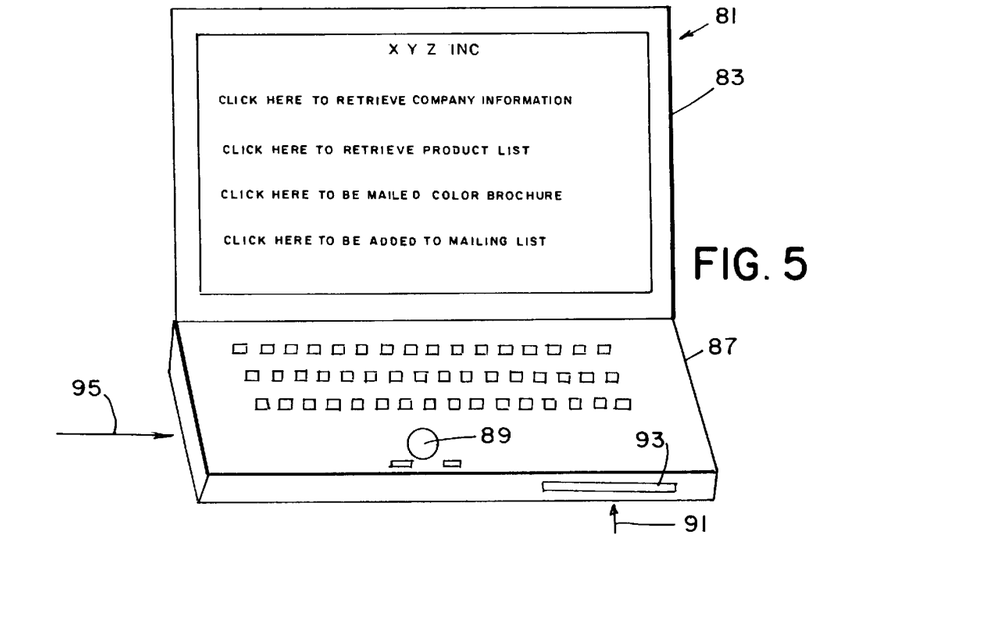
FIG. 5 is a schematic representation of an exhibitor's laptop with place to insert an IDisk badge and a place to insert a PC card.

As shown in FIG. 4, the user has a hand held device 61 which has a communications interface 63 for communicating 65 through radio, infrared, or wire with an interface 65 in the exhibitor's computer 66. Interface 65 reads information to the hard disk 67 as controlled by the access program 69 and writes information from the hard disk into the user's communication interface 63 as controlled by the screen/keyboard/mouse 71 and the GUI program 73, FIG. 5 schematically shows an exhibitor's station 81 which is a laptop computer 83 with a screen 85, keyboard 87, and mouse 89. A user inserts 91 and IDisk in slot 93 to begin reading and writing operations. A PC card is inserted 95 when preparing the exhibitor's station.

In this system architecture, the exhibitor has access to everything in bold. They can control what is presented on the screen by modifying the custom, vendor specific information (e.g., Hypertext Markup Language (HTML) code). Default HTML code is provided which can be used as a template to create the customized HTML which the attendee will see. the setup script is used to provide the novice HTML user with a menuized interface (form) to be filled out so they do not have to edit the HTML code. The disk access program is a compiled C program which performs all the disk access functions.

In this system architecture, shown in FIG. 3, the user interacts the system on the vendor's laptop. FIG. 3 also shows how the vendor's laptop is architectured. The screen, keyboard, and the mouse interactions are controlled through the Graphical User Interface (GUI) program (either the Custom GUI software or WWW Browser). This GUI program allows the user and/or the vendor the option to annotate or label information being transferred. All of the items underlined on the internal hard disk can be seen by the vendor; each MENUOPT file contains the names of the attendees that selected the corresponding menu option and the attendee.log file contains the names of the attendees who visited the booth. The rest of the items stored on the hard disk are hidden from the vendor. The activity.log file is retrieved by the software for tracking the activity at that booth. The files are installed onto the internal hard disk using an installation program. All of the vendor's data can be preconfigured for that vendor by editing the custom menu option file. The custom menu option file links the menu option with those files that are transferred between the floppy disk and the hard disk using the disk access program.

An alternative system architecture (implementation) option is to replace the custom GUI interface program with a commercial GUI package such as a World Wide Web Browser. The configuration file (i.e., custom menu option file) is replaced with a set of HTML (HyperText Markup Language) files. A default HTML code can be provided to the vendor to be used as a template for adding/customizing the IDisk station for that vendor's information. A setup script can be provided to the novice HTML user with a menuized interface (form) to be filled out so that they do not have to edit the HTML code.

Additionally, the hidden information stored on the internal hard disk may be stored on a removable medium (e.g., PCMCIA card). After the exhibition is over, the hard card with the program and other hidden files (e.g., activity log) are returned to the organizer. The MENUOPT files and attendee.log file can be kept on the internal hard disk or placed onto a floppy disk for the exhibitor to keep. Another possible implementation option is to store some of the software on the user's badge (floppy disk). A utility can also be stored on the badge to help the user access, sort, search, import, to applications, etc. the data on their own computer after the event.

Instead of using a floppy disk for storage and communication between the user and the vendor's laptop, a different type of communications device can be used (e.g. radio link, infrared link, or plug in cable/connector.) That implementation option is shown in FIG. 4.

Disk Access Program

The disk access program protects the floppy disk from viruses. All disk I/O functions must be performed through this disk access program. If this program is bypassed, the next time a disk is checked or information is written to the disk, the user will be alerted that the integrity of the disk has been compromised and should return the disk to the automated badge customer support windows/stations to 'clean' that disk.

Therefore, if a virus is written to the floppy, the user will be notified immediately. Preventing unauthorized disk access prevents someone from copying/stealing our disk access program for their own benefit. Since the disk access program is compiled, they cannot access the source code and modify it.

Since files are kept in the clear the user can access the files and modify them once they leave the conference. A utility can be stored on the disk when created to test for disk integrity.

The disk access program regulates the amount of information that can be stored on the disk per exhibitor. This number can be configured on a per conference basis (dependent upon the expected number of exhibitors). It is possible that one can estimate the maximum number of files which can be stored to be fewer then the number of exhibitors, in which case, multiple disks can be issued to an attendee if they fill up their first disk (using some rule set up by the conference organizers).

A "fuel gauge" can be displayed showing how many unused records are still on the disk.

Automated Disk Integrity/Cleaning Station

If an attendee is notified that their disk fails an integrity check, they would insert the disk into the Automated Disk Integrity/Cleaning Station. This station will attempt to regain the integrity of the disk by following several steps.

1. Foreign Matter On Disk

Check to see if an 'unknown'/'invalid' file exists on the disk. If so, delete the file and see if the disk now passes integrity.

2. Missing/Delete Information

If a file is missing off the disk, then remove file from index and see if integrity now passes.

2a. The attendee can view the "table of contents" to show which exhibitor's information is properly contained on the disk.

3. Corrupted Attendee Information

These disk check/cleaning stations are on the same network (perhaps even the same computer) as that used for creating the badge. Therefore, if the attendee.nfo file is corrupted, a new version of the file is written to the disk and integrity is re-checked.

4. Re-create Diskette

At this point, the known (valid) information on the disk is copied to the hard drive on the station. The disk is reformatted, data is written back, and integrity is checked.

5. New Badge

If the disk will not format and/or store information correctly (which is the case if it has gone to this step), then the attendee (owner of the disk) is notified to exchange this badge for a new one.

Possible Extensions

This badge is not limited to storing only exhibitor and attendee information. It can be used to store other forms of information (e.g., general preferences, configuration, personal, corporate and authentication information). In this fashion, it could be used as a debit, credit, or other forms of electronic tokens for commerce, etc.; tokens can be incremented or decremented according to application and usage.

A floppy disk is a preferred medium for holding data visual and electronic identification and storage of information. Any medium could be used, e.g., PC Cards, smart cards, ZipDisk, Flash card, Floptical, and any future storage medium.

As used herein, IDisk refers to any storage medium which provides visual data as well.

The current application is for conferences, exhibitions, etc, but the idea of carrying around the IDisk which contains information about the owner can be extended in many ways. For example:

When persons approach a computer and want to use that computer, they insert their IDisk to activate automatic configuration. The automatic configuration is based on the information read from the IDisk (their stored electronic ID). The automatic configuration process uses the IDisk data to activate that user's environment by accessing a general configuration program which is customized by reading the IDisk data.

When two people meet and wish to exchange their electronic ID, they simply use their IDisks to do the exchange in laptop, notebook or office computers.

When people want to access "general use" computers, at conferences, schools, computer sales shows, etc., the IDisk could provide a secure method of limiting access to only those who are allowed to use those machines.

The software is provided on a PCMCIA card. However, it can be done in other ways:

In one, a laptop is configured with the information on the hard disk. The software could be installed on the vendor's laptop or PC. An external device could be attached, other than a PCMCIA card (now known as PC Cards), for example, an external hard drive, a Flash card, etc.

The paper label on the IDisk could be colored for "Badge Labeling" or colored floppy disks could be used instead of coloring the labels, or both.

Any particular file names such as "attendee.nfo" are simply examples. Also the contents of the IDisk that are listed are just an example.

Software automatically detects when the disk has been inserted, immediately starts reading the IDisk, and presents a customized menu for that attendee.

Another extension is to provide "kiosks", which would likely be unstaffed, around the convention location which would contain a PC or laptop. The attendee can insert his IDisk into a kiosk and view information about the event, and can store information onto his IDisk, such as, for example, a map of a portion of the exhibition. Also, the user can view the contents of his IDisk. He may be able to modify the contents (and possibly his electronic ID) on his own disk.

The inside of a double sized business card gives directions for use. This card is inserted behind the floppy disk which sits in a plastic badge holder worn by the attendee.

The new floppy disk as a badge greatly simplifies dealing with the exhibitors and attendees.

The attendee's basic ID profile in on the IDisk badge in electronic form. Thus the data on the electronic business card is easily transferred to any exhibitor. Moreover, and more importantly, it allows the attendee to download onto a badge any exhibitor information one wishes to capture. The DOS formatted diskette full of ASCII files is taken home for use on ones own computer.

The new IDisk has several benefits

ID information is in electronic form for easy transfer.

Exhibitor data such as company information, product brochures, product/price lists and web page URLs are stored directly onto your disk.

One takes home an electronic record of the vendors visited.

The card eliminates having to carry around piles of brochures.

One can automatically search, import, store, format, etc, all the disk data.

The disk works with a home/office PC. The ASCII files can be imported to a word processor, an address manager, a spreadsheet or an e-mail package.

The following are instructions for use:

1. Place IDisk into exhibitor's computer.

2. Select among the first three menu options to upload your requests to the exhibitor.

3. Select among the remaining menu options to download exhibitor data to your badge.

4. A visit record may be viewed by selecting menu option 0.

5. Eject disk when finished.

Upon Returning Home

The "visit record" will be in the file 'visit.txt.'

'Contents.txt' will the table of contents of the files that were downloaded.

These files can be searched using any word processor or utility.

The ASCII text files can be imported into any application.

The file naming convention for the exhibitor data stored on the badge is the first three characters of the company name followed by an underscore followed by a description and ending in 'txt'. For example, the file containing company information for Nomadix is nom_info.txt.

The disk is protected against misuse during the conference, and as such one should ONLY use the disk on an exhibitor's IDisk Station until the conference is over. This will help protect against viruses. Unauthorized modification of an IDisk will cause it to be rejected by the System. In which case, it must be taken to the Help Desk for restoration.

The new ID disk gives exhibitors immediate electronic access to the customers.

Prospective customers will get exhibitor's company information placed directly onto a floppy disk which they will take with them. The exhibitor will also obtain basic information about customers in digital form for the exhibitor's database.

The invention replaces the old fashion badge that attendees wear today with an ID badge which is a floppy disk loaded with information. The ID badge not only identifies the attendee by name visually, but also contains the customer's electronic imprint (name, address, phone, email, URL, et.) plus room for information about exhibitors. When prospective customers visit booths, they place the ID badge into a floppy disk drive on a laptop dedicated to that function. That action causes their digital imprint to be stored in the exhibitor's database.

At user's options, which exhibitors encourage, customers copy information onto their disk which they take away with them. This information would be a company's basic data (address, phone, email, home page URL, etc.), product brochures, a product/price list, full company description, contact information, etc. When attendees leave a conference, they have an electronic summary of the exhibits they visited, as well as information they retrieved from the exhibitors; and they can easily visit the exhibitor's Web home page.

All exhibitors have to do is to supply a (dedicated) laptop and an electronic text version of the company information it wishes the attendees to take away.

The organizer can provide everything needed; the laptop, downloading of a full Web home page and extracting suitable items. The exhibitor can get a turnkey system up and running when it arrives.

The most valuable asset an exhibitor will acquire is the list of prospective customers who come to a booth thereby expressing an interest in a product.

But how does an exhibitor collect their names, addresses, e-mail identifiers, etc.? And very importantly, what do they take away with them after they leave a booth? At most tradeshows, an exhibitor either collects business cards, or swipes plastic through a "credit card" imprinter, or "reads" a magnetic stripe on a card, etc. These all have some or all of the following severe shortcomings:

One ends up with paper copies of names, etc. They must be keyed into a computer after returning to the office.

Prospects run out of business cards, or are reluctant to part with those they have.

Scraps of paper on which names are written get lost.

Prospects throw away literature if they collected any in the first place.

There is no coupling to the Internet, the World Wide Web, etc.

On the other hand, with the new ID disk technology, an exhibitor:

has access to a badge which is visually and electronically identifies the attendee, ends up with a formatted database of all visitors to a booth; this is easily imported to any application program used to track prospective customers, gets a list of what the customers want (add to mailing list, send brochure, contact directly, etc.), provides company information to the customer in a form that they will be able to load directly into their computers, to print out at their offices, to use to visit an exhibitor's home page easily, is able to search the information electronically for customer names, product names, descriptions, or anything else, can electronically read and write information, eliminates the paper mess, and is more organized, which encourages further contact with customers.

The exhibitor brings to the conference a dedicated IBM PC-based laptop with a floppy drive and supplies ahead of time an electronic text version (in ASCII format) of the company information one wishes the attendee to take away. The following information is needed:

basic company information (company name, address, phone, fax, e-mail, home page URL, etc.) and up to six information packs that the user can select from (e.g., product brochures, a list of products, a price list, a full company description, etc.). For each of these a one-to-three word descriptor is needed so that it can be added to the menu items the customer will see.

This information can be sent to the organizer via e-mail. Alternatively, it can be sent on a floppy disk in ASCII format. The only constraint is that the total amount of text be limited to a maximum of 50 Kilobytes. The exhibitor's company logo will be on all screens seen by the user on the laptop provided. The organizer will load the laptop with the software to run live at the conference.

As an option, the organizer can provide everything needed (the laptop, downloading a full Web home page, and extracting suitable items, etc.). Thus, if desired, the exhibitor can get a turnkey system up and running when the exhibitor arrives.

The present invention provides a trade-show badging system for two-way data exchange. It uses a floppy disk as an ID badge and stores exhibitor's data on the ID badge. A user takes home an electronic record of the event, electronically stores all the brochures onto the diskette and computerizes a business card by using the IDisk.

The new IDisk System replaces the old fashioned badge with a floppy disk loaded with information that attendees take home with them. The IDisk System has two components: the attendee Idisk badge and the exhibitor IDisk station. The badge identifies attendees by name visually and by electronic imprint, plus it provides room to retrieve selected data from the exhibitor's IDisk station.

An attendee is issued a floppy disk badge for two-way data exchange and visual and electronic identification. The attendee simply inserts an IDisk into the exhibitor's computer, views menus displayed on the computer screen, selects items from the menu (copying data to/from IDisk), and ejects the disk when finished. Attendees benefit from the new ID badge because: it holds his/her electronic ID, it stores exhibitor's data, it works on a home/office PC, and it automates data transfer.

The exhibitor's IDisk station includes a computer containing two-way data exchange software, a floppy disk drive, exhibitor's information, a data base of visitors, and a graphical user interface.

Menus point to company information, customer information, product brochures, product/price lists, web page URLs, and attendee's requests for follow up.

The exhibitor benefits as the new system builds a customer data base, lists follow-up requests, summarizes booth activity, provides immediate electronic access to customers and protects from unwanted disk access, corruption and viruses.

While the invention has been described with reference to specific embodiments, modifications and variations of the invention may be constructed without departing from the scope of the invention, which is defined in the following claims.

We claim:

1. A conference ID badge system comprising a portable identification memory device, an identification writer for writing a user's identification in the memory device, a label printer connected to the identification writer for printing a label with a part of the user's identification in large distance-legible letters, the label being fixed on the memory device, a memory device holder with an attachment for attaching to a user's clothing, and a receiver for receiving the portable identification memory device and for displaying the label on the memory device for visual access from a distance, plural storage reader-writers at exhibitor locations having a memory storage for storing exhibitor information about exhibitors, and having memory device slots for temporarily holding the portable identification memory device and having reading and writing heads adjacent the slots for reading user's identification into the storage and for writing stored exhibitor information into the portable identification memory device.

2. The system of claim 1 wherein the identification writer is a computer.

3. The system of claim 1 wherein the storage reader-writers are computers.

4. The system of claim 1 wherein the portable identification memory device is a 3.5" floppy disk.

5. The system of claim 1 wherein the portable identification memory device is a PCMCIA or PC Card.

6. The system of claim 1 wherein the portable identification memory device is a smart card.

7. The system of claim 1 wherein the portable identification memory device is a Flash card.

8. The system of claim 1 wherein the portable identification memory device is a ZipDisk.

9. The system of claim 1 wherein the portable identification memory device is a Floptical disk.

10. A convention attendee system comprising an exhibitor's station having a programmable computer with a program for automatically receiving and storing information from a user's identification data storage medium and for writing on that data storage medium information about an exhibitor and its products from a hard disk storage in the computer under control of a user according to the user's selection of menus on a screen on the computer with a keyboard and mouse connected to the computer.

11. The system of claim 10 further comprising attendees' badges comprising data storage media having affixed thereto large visually readable identification labels and carried in and removable from a clear plastic badge pockets with attachments for attaching the plastic badge pockets to clothing of attendees.

12. The system of claim 10 wherein the data storage media are 3.5" floppy diskettes bearing large labels with identification indicia visually readable through the plastic pockets.

13. A convention attendee-exhibitor interface system comprising an attendee carried device including an identification badge and a coupled user data storage media for prerecording user identification data including an attendees' name, title, organization and addresses details in a predetermined format for recording utility software for accessing the storage medium for reading writing and checking data, and for providing available storage for exhibitor information, an exhibitor station having a computer with a memory for storing and providing exhibitor information data, a screen for displaying menus, a keyboard and a mouse for entering selections from the menu, a slot for receiving a control and an interface for receiving data from the user data storage media and for writing user identification data information from the attendee carried device into the memory under direction of the control and for providing the exhibitor information data from the memory to the user's data storage media under direction of the control and user's inputs on the keyboard and the mouse.

14. The system of claim 13, wherein the data storage media are 3.5" floppy diskettes bearing large labels with identification indicia visually readable through the plastic pockets.

15. The system of claim 13 wherein the attendee's device includes a complementary user's interface and the exhibitor station computer interface comprises an interface for communicating data with the user's complementary interface by radio, infrared or wire.

16. The system of claim 13 wherein the control provides an exhibitor with a complete record of identification of attendees who visited the exhibitor's booth.

17. The system of claim 16 wherein the control provides an organizer a complete record of attendees who visited an exhibitor's booth, and a complete record of attendee's responses to menus displayed on the exhibitor's computer screens.

18. The system of claim 13 wherein the control provides an organizer of a convention or trade show a complete record of attendees who visited an exhibitor's booth.

19. The system of claim 13 wherein the control provides an organizer of a convention or trade show a complete record of attendees who visited an exhibitor's booth, and a complete record of attendee's responses to menus displayed on the exhibitor's computer screens.

20. The system of claim 18, wherein a control writes the time at which an attendee visits a booth, thereby providing time tracking of when the attendee attends the booth, how long before the attendee arrives at a next booth, and the order of booths visited.

21. An ID badge system comprising a portable identification memory device, an identification writer for writing a user's identification in the memory device, a label printer connected to the identification writer for printing a label, a label with a part of the user's identification in large distance-legible letters, the label being fixed on the memory device, a memory device holder with an attachment for attaching to a user's clothing, and a receiver for receiving the portable memory device and for displaying the label on the memory device for visual access from a distance, plural storage reader-writers at locations having a memory storage for storing information, and having plural memory device slots for temporarily holding plural portable memory devices and having reading and writing heads adjacent the slots for reading user's identification into the storage and for writing stored information into the portable identification memory device.

22. The system of claim 21 wherein the identification writer is a computer.

23. The system of claim 21 wherein the storage reader-writers are computers.

24. The system of claim 21 wherein the portable identification memory device is a 3.5" floppy disk.

25. The system of claim 21 wherein the portable identification memory device is a PCMCIA or PC Card.

26. The system of claim 21 wherein the portable identification memory device is a smart card.

27. The system of claim 21 wherein the portable identification memory device is a Flash card.

28. The system of claim 21 wherein the portable identification memory device is a ZipDisk.

29. The system of claim 21 wherein the portable identification memory device is a Floptical disk.

30. A user interface system comprising a station having a programmable computer with a program for automatically receiving and storing information from a user's identification data storage medium and for writing on that data storage medium information from a hard disk storage in the computer under control of a user according to the user's selection of menus on a screen on the computer with a keyboard and mouse connected to the computer.

31. The system of claim 30 further comprising users' badges comprising data storage media having affixed thereto large visually readable identification labels and carried in and removable from a clear plastic badge pockets with attachments for attaching the plastic badge pockets to clothing of users.

32. The system of claim 30 wherein the data storage media are 3.5" floppy diskettes bearing large labels with identification indicia visually readable through the plastic pockets.

33. A user interface system comprising a user carried device including an identification badge and a coupled user data storage media for prerecording user identification data including users' names, titles, organizations and addresses details in a predetermined format for recording utility software for accessing the storage media for reading, writing and checking data, and for providing available storage for information, a station having a computer with a memory for storing and providing information data, a screen for displaying menus, a keyboard and a mouse for entering selections from the menu, a slot for receiving a control and an interface for receiving data from the user data storage media and for writing user identification data information from the user carried device into the memory under direction of the control and for providing the information data from the memory to the user's data storage media under direction of the control and user's inputs on the keyboard and the mouse.

34. The system of claim 33, wherein the data storage media are 3.5" floppy diskettes bearing large labels with identification indicia visually readable through plastic pockets.

35. The system of claim 33 wherein the user carried device includes a complementary user's interface and the station computer interface comprises an interface for communicating data with the user's complementary interface by radio, infrared or wire.

36. The system of claim 33 wherein the control provides a complete record of identification of users who visited the station.

37. The system of claim 36 wherein the control provides an organizer a complete record of users who visited a station, and a complete record of users responses to menus displayed on the computer screen.

38. The system of claim 33 wherein the control provides an organizer a record of users who visited the station.

39. The system of claim 33 wherein the control provides an organizer a complete record of users who visited a station, and a complete record of users' responses to menus displayed on the computer screen.

40. The system of claim 38, wherein the control writes the time at which users visit the station, provides time tracking of when users attended the station, how long before the users arrived at a next station and an order of stations visited by the users.

41. A data transfer system, comprising:
a portable data storage medium having user data stored thereon; and
a terminal having terminal data stored therein, the terminal including a data transfer device which, when operatively connected to the storage medium, causes the user data to be transferred to and stored in the terminal, and enables at least a selected item of the terminal data to be transferred to and stored on the storage medium.

42. A system as in claim 41, in which:
the storage medium comprises a removable disk;
the data transfer device comprises a removable disk drive; and
the data transfer device is operatively connected to the storage medium by inserting the removable disk in the removable disk drive.

43. A system as in claim 42, in which:
the removable disk is a 3.5" magnetic floppy disk; and
the removable disk drive is a 3.5" magnetic floppy disk drive.

44. A system as in claim 41, in which:
the storage medium comprises a portable communicator for storing the user data and the terminal data; and
the data transfer device comprises a fixed communicator which communicates with the portable communicator.

45. A system as in claim 41, in which the storage medium comprises a disk having a storage medium user's name thereon.

46. A system as in claim 45, in which the storage medium further comprises a label which has a storage medium user's name thereon and is affixed to the disk.

47. A system as in claim 45, further comprising a disk holder for holding the disk such that the user's name is visible.

48. A system as in claim 27, in which the disk holder comprises an attachment for attaching the disk holder to a user's clothing.

49. A system as in claim 41, in which the terminal data is stored the storage medium as clear text.

50. A system as in claim 41, in which the storage medium further stores a program for reading terminal data which is stored thereon.

51. A system as in claim 50, in which:
the terminal data is stored on the storage medium as Hypertext Markup Language (HTML) code; and
the program comprises a World Wide Web (WWW) browser for reading the HTML code.

52. A system as in claim 41, in which the terminal comprises:
a display for displaying a menu of items of the terminal data that can be selected for transfer to the storage medium; and
an input unit which enables selection of the items.

53. A system as in claim 52, in which the input unit comprises at least one of a keyboard and a mouse.

54. A system as in claim 52, which the terminal comprises a Graphic User Interface (GUI) for causing the display to display the menu and enable selection of the items using the input unit.

55. A system as in claim 41, further comprising a control medium for storing a control program for the terminal.

56. A system as in claim 55, in which the control medium comprises an internal storage device in the terminal.

57. A system as in claim 56, in which the internal storage device comprises a magnetic fixed disk drive.

58. A system as in claim 55, in which:
the control medium is portable; and
the system further comprises a reader which is operatively connected to the terminal for reading the control medium.

59. A system as in claim 55, in which:

the control medium comprises a PC card; and the system further comprises a PC card reader which is operatively connected to the terminal for reading the PC card.

60. A system as in claim 55, in which the control program comprises code for preventing access to the control medium by the terminal except under control of the control program.

61. A system as in claim 55, in which the control program comprises code for preventing transmission of viruses to and from the storage medium and the terminal.

62. An identification badge comprising:

a portable data storage medium having user data stored thereon and which stores terminal data written thereon from a computer terminal; and a visual user identification on the storage medium.

63. A badge as in claim 62, further comprising a label which has the visual user identification thereon and which is affixed to the storage medium.

64. A badge as in claim 62, in which the visual user identification comprises a user name.

65. A badge as in claim 62, in which the storage medium comprises a removable disk.

66. A badge as in claim 62, in which the storage medium comprises a 3.5" magnetic floppy disk.

67. A badge as in claim 62, further comprising a disk holder for holding the disk such that the visual user identification is visible.

68. A badge as in claim 67, in which the disk holder comprises an attachment for attaching the disk holder to a user's clothing.

69. A badge as in claim 62, in which the terminal data is stored on the storage medium as clear text.

70. A badge as in claim 62, in which the storage medium further stores a program for reading terminal data which is stored thereon.

71. A badge as in claim 70, in which:

the terminal data is stored on the storage medium as Hypertext Markup Language (HTML) code; and the program comprises a World Wide Web (WWW) browser for reading the HTML code.

72. A conference ID badge system, comprising:

an attendee badge including a data storage medium having attendee data stored thereon; and an exhibitor terminal having exhibitor data stored therein, the exhibitor terminal including a data transfer device which, when operatively connected to the storage medium, causes the attendee data to be transferred to and stored in the exhibitor terminal, and enables at least a selected item of the exhibitor data to be transferred to and stored on the storage medium.

73. A system as in claim 72, in which:

the storage medium comprises a removable disk;

the data transfer device comprises a removable disk drive; and the data transfer device is operatively connected to the storage medium by inserting the removable disk in the removable disk drive.

74. A system as in claim 73, in which:

the removable disk is a 3.5" magnetic floppy disk; and the removable disk drive is a 3.5" magnetic floppy disk drive.

75. A system as in claim 72, in which:

the storage medium comprises a portable communicator for storing the attendee data and the exhibitor data; and the data transfer device comprises a fixed communicator which communicates with the portable communicator.

76. A system as in claim 72, in which:

the storage medium comprises a disk; and the badge further comprises an attendee's name on the disk.

77. A system as in claim 76, in which the storage medium further comprises a label which has the attendee's name thereon and is affixed to the disk.

78. A system as in claim 76, further comprising a disk holder for holding the disk such that the attendee's name is visible.

79. A system as in claim 78, in which the disk holder comprises an attachment for attaching the disk holder to an attendee's clothing.

80. A system as in claim 72, in which the exhibitor data is stored on the storage medium as clear text.

81. A system as in claim 72, in which the storage medium further stores a program for reading exhibitor data which is stored thereon.

82. A system as in claim 81, in which:

the exhibitor data is stored on the storage medium as Hypertext Markup Language (HTML) code; and the program comprises a World Wide Web (WWW) browser for reading the HTML code.

83. A system as in claim 72, in which the exhibitor terminal comprises:

a display for displaying a menu of items of the exhibitor data that can be selected for transfer to the storage medium; and an input unit which enables selection of the items.

84. A system as in claim 72, in which the input unit comprises at least one of a keyboard and a mouse.

85. A system as in claim 83, in which the exhibitor terminal comprises a Graphic User Interface (GUI) for causing the display to display the menu and enable selection of the items using the input unit.

86. A system as in claim 72, further comprising a control medium for storing a control program for the exhibitor terminal.

87. A system as in claim 86, in which the control medium comprises an internal storage device in the exhibitor terminal.

88. A system as in claim 87, in which the internal storage device comprises a magnetic fixed disk drive.

89. A system as in claim 86, in which:

the control medium is portable; and the system further comprises a reader which is operatively connected to the exhibitor terminal for reading the control medium.

90. A system as in claim 86, in which:

the control medium comprises a PC card; and the system further comprises a PC card reader which is operatively connected to the exhibitor terminal for reading the PC card.

91. A system as in claim 86, in which the control program comprises code for preventing access to the control medium by the exhibitor terminal except under control of the control program.

92. A system as in claim 86, in which the control program comprises code for preventing transmission of viruses to and from the storage medium and the exhibitor terminal.

93. A system as in claim 72, further comprising an administrator unit for storing the attendee data on the storage medium.

94. A system as in claim 93, in which:
the storage medium comprises a disk, and a label which has an attendee's name printed thereon and is affixed to the disk; and
the administrator unit comprises a printer for printing the label.

95. A system as in claim 72, further comprising an administrator unit which is configured to record attendee data which is transferred to and stored in the exhibitor terminal, and selected items of exhibitor data which are transferred to and stored on the storage medium.

96. A system as in claim 95, further comprising a plurality of additional attendee badges and exhibitor terminals, in which the administrator unit is configured to record attendee data which is transferred to and stored in all exhibitor terminals, and selected items of exhibitor data which are transferred to and stored on all storage mediums.

97. A system as in claim 96, in which:
the administrator unit is configured to log attendee badges and exhibitor terminals between which attendee data is transferred.

98. A system as in claim 97, in which the administrator unit is further configured to log attendee badges and selected items of exhibitor data that are transferred.

99. A system as in claim 97, in which the administrator unit is further configured to log times at which attendee data is transferred.

* * * * *